(12) United States Patent
Zhu et al.

(10) Patent No.: US 10,566,773 B2
(45) Date of Patent: Feb. 18, 2020

(54) TRANSMISSION AND CLUTCH DEVICE FOR ELECTRIC CHASSIS VEHICLE, AND ELECTRIC CHASSIS VEHICLE

(71) Applicant: ABB Schweiz AG, Baden (CH)

(72) Inventors: Yongwei Zhu, Beijing (CN); Zhijian Zhuang, Fujian (CN); Qiliang Wang, Fujian (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/050,743

(22) Filed: Jul. 31, 2018

(65) Prior Publication Data
US 2018/0337518 A1 Nov. 22, 2018

Related U.S. Application Data

(63) Continuation of application No. PCT/CN2016/073622, filed on Feb. 5, 2016.

(51) Int. Cl.
*F16D 1/108* (2006.01)
*H02B 11/133* (2006.01)
(Continued)

(52) U.S. Cl.
CPC ............ *H02B 11/133* (2013.01); *F16D 1/108* (2013.01); *F16H 1/20* (2013.01); *F16D 2001/102* (2013.01)

(58) Field of Classification Search
CPC ........ H01H 71/128; H01H 3/32; H01H 71/12; H01H 33/42; H01H 3/30; H01H 3/38;
(Continued)

(56) References Cited

U.S. PATENT DOCUMENTS 3,518,888 A * 7/1970 Valdettaro ................. H03J 1/14
74/10.8
3,882,737 A * 5/1975 Crim .................. A61B 17/1617
74/665 S
(Continued)

FOREIGN PATENT DOCUMENTS

CN 201498909 U 6/2010
CN 201685702 U 12/2010
(Continued)

OTHER PUBLICATIONS

Chinese Office Action, Chinese Patent Application No. 201680062900.6, dated Feb. 11, 2019, 6 pages including English translation.
(Continued)

*Primary Examiner* — Ahmed M Saeed
(74) *Attorney, Agent, or Firm* — Taft Stettinius & Hollister LLP; J. Bruce Schelkopf

(57) ABSTRACT

The present invention provides a transmission and clutch device of an electric chassis and the electric chassis. The transmission and clutch device includes a transmission shaft, a first drive shaft, a first compression spring, a first gear, a second compression spring and a second drive shaft successively along an axial direction, the first drive shaft and the second drive shaft are fixed together, the transmission shaft is provided for connecting to a motor, and the first gear is fixed on a base in a rotatable manner, wherein the first drive shaft is connected with the transmission shaft in a relatively sliding manner and can rotate synchronously along with the drive shaft; and two end faces of the first gear are each opened with a keyway for separably cooperating with a protrusion of an end face of the first drive shaft or a protrusion of an end face of the second drive shaft. The transmission and clutch device according to the present invention has a high modularization level and high inter-
(Continued)

changeability, and can be automatically switched rapidly and stably.

14 Claims, 15 Drawing Sheets

(51) Int. Cl.
*F16H 1/20* (2006.01)
*F16D 1/10* (2006.01)

(58) Field of Classification Search
CPC ...... H02B 11/127; H02B 1/36; H02B 11/167; H02B 11/133; Y10T 74/19874; Y10T 74/19642; Y10T 74/19647; F16D 1/108; F16D 2001/102; F16D 11/14; F16D 2023/123; F16D 23/12; F16D 2011/002; F16D 2001/103; F16D 2011/008; F16D 23/14; F16D 11/10; F16H 1/20
See application file for complete search history.

(56) References Cited

U.S. PATENT DOCUMENTS

| | | | | |
|---|---|---|---|---|
| 4,493,479 | A * | 1/1985 | Clark | B66D 1/58 188/134 |
| 5,694,812 | A * | 12/1997 | Maue | B60N 2/0248 74/471 R |
| 5,916,327 | A * | 6/1999 | Maue | B60N 2/0248 15/250.001 |
| 7,671,292 | B2 * | 3/2010 | Suter | H01H 3/3026 200/400 |
| 2010/0307289 | A1 | 12/2010 | Blanchard | |
| 2013/0161150 | A1 * | 6/2013 | McCrary | F16D 43/04 192/41 R |
| 2014/0345404 | A1 * | 11/2014 | Wu | F16D 11/10 74/405 |
| 2015/0027841 | A1 * | 1/2015 | Kainuma | F16D 11/14 192/69 |
| 2015/0255965 | A1 * | 9/2015 | Boyce | H02B 11/127 361/605 |

FOREIGN PATENT DOCUMENTS

| | | |
|---|---|---|
| CN | 103326270 A | 9/2013 |
| CN | 203312685 U | 11/2013 |
| CN | 203570931 U | 4/2014 |
| CN | 203747274 U | 7/2014 |
| CN | 204391587 U | 6/2015 |
| DE | 10040685 C1 | 1/2002 |
| KR | 101308754 B | 9/2013 |

OTHER PUBLICATIONS

Chinese Search Report, Chinese Patent Application No. 201680062900. 6, dated Feb. 11, 2019, 5 pages including English translation.
Intellectual Property Office of the P.R. China, International Search Report & Written Opinion issued in corresponding Application No. PCT/CN2016/073622, dated Nov. 9, 2016, 8 pages.
Supplementary European Search Report dated Aug. 12, 2019 issued in EP Application No. 16888808.9 (7 pages).

* cited by examiner

TRANSMISSION AND CLUTCH DEVICE FOR ELECTRIC CHASSIS VEHICLE, AND ELECTRIC CHASSIS VEHICLE

FIELD

The present invention relates to a transmission and clutch device, and more specifically, to a transmission and clutch device for an electric chassis, particularly a transmission and clutch device for implementing advancement and withdrawal of a breaker, and an electric chassis comprising the same.

BACKGROUND

In the existing withdrawable switchgear, in order to enable a breaker to implement an advancement and withdrawal function conveniently (the advancement refers to advancement from a testing position to a work position, and the withdrawal refers to withdrawal from the work position to the testing position), a chassis is typically used for carrying elements, such as a breaker and the like, and moves forwards and backwards on a track within the switchgear by wheels mounted on the chassis.

In order to move the chassis within the switchgear, a manual operation mechanism is used in most of the current common chassis, i.e., a lead screw is provided on the chassis, a nut fixed on a chassis bracket is arranged on the lead screw, an end of which is sleeved with a handle, the handle is used to drive the lead screw to rotate, such that the screw nut drives the chassis to move forwards and backwards, thereby implementing advancement and withdrawal of the breaker chassis. Due to a manual manner of operating the handle manually, the manual chassis has deficiencies, such as a low work efficiency, laborious operations, inconvenience for a remote operation and the like, which cannot tally with the development of the power automation.

An electric chassis is developed to reduce the operation workload of the substation operation workload, improve the unattended ability of the power system, and implement the advancement and withdrawal of the breaker electrically and remotely. In the existing electric chassis, a motor, a transmission device, a clutch and a lead screw are mounted on the chassis, the motor and the transmission device are connected to the clutch, and the other end of the clutch is connected to the lead screw. The advancement and withdrawal of the chassis are controlled by positive and reversal rotation of the motor, so as to implement motorization and automation of the movement of the chassis. In the prior art, a worm gear mechanism is typically used in a transmission device to drive a sprocket shaft to rotate and further drive the lead screw to rotate. Such transmission manner using a worm gear leads to that the axis of the motor is necessarily perpendicular to the axis of the sprocket shaft. In addition, due to a limited volume of the switchgear, the transmission and clutch device of the electric chassis cannot be designed with an exceedingly large size. However, the existing electric and manual transmission and clutch devices can hardly be modularized and standardized due to a great number of parts, a complicated structure, a strict requirement on processing precision, a large occupancy space, and complicated mounting maintenance.

Hence, for the breaker electric chassis, there arises a problem to be solved in the art, i.e., how to reliably implement transmission and clutch while satisfying the space requirements.

SUMMARY

An objective of the present invention is to provide a transmission and clutch device having a simple structure, a high modularization level and high interchangeability while implementing automatic switch rapidly and stably between an electric and a manual manner.

The technical solution of the present invention provides a transmission and clutch device of an electric chassis, for implementing advancement and withdrawal of a breaker electrically and manually. The transmission and clutch device comprises a transmission shaft, a first drive shaft, a first compression spring, a first gear, a second compression spring and a second drive shaft successively along an axial direction, the first drive shaft and the second drive shaft are fixed together, the transmission shaft is provided for connecting to a motor, and the first gear is fixed onto a base in a rotatable manner, wherein the first drive shaft is connected with the transmission shaft in a relatively sliding manner and rotatable synchronously with the drive shaft; and two end faces of the first gear are both formed with a keyway for separably cooperating with a protrusion of an end face of the first drive shaft or a protrusion of an end face of the second drive shaft, wherein a lead screw is electrically driven to rotate during cooperating, and the lead screw is driven manually to rotate during separation.

According to an optimum embodiment of the present disclosure, the transmission and clutch device further comprises a drive pin, the first drive shaft is partly arranged outside the transmission shaft, the first drive shaft is provided with an oblique opening, and the drive pin is mounted on the transmission shaft by passing through the oblique opening of the first drive shaft from inside of a circumference.

According to an optimum embodiment of the present disclosure, the transmission and clutch device further comprises an adjustment screw, an adjustment spring and a friction block, the adjustment screw is fixed on the base, the adjustment spring is clamped between the adjustment screw and the friction block, and the friction block abuts against a periphery of the first drive shaft for providing a friction resistance for rotation of the first drive shaft.

According to an optimum embodiment of the present disclosure, the periphery of the first drive shaft is rough for increasing the friction resistance.

According to an optimum embodiment of the present disclosure, the first drive shaft is a spline shaft for increasing the friction resistance.

According to an optimum embodiment of the present disclosure, the transmission shaft is provided with an internal spindle hole for cooperating with a spline output shaft of the motor.

According to an optimum embodiment of the present disclosure, the transmission and clutch device further comprises a second drive pin, the transmission shaft is partly arranged outside the first drive shaft, the transmission shaft is provided with a second oblique opening, and the second drive pin is mounted on the first drive shaft inwardly from a circumference through the second oblique opening of the transmission shaft.

According to an optimum embodiment of the present disclosure, the transmission and clutch device further comprises an upper closure cover for joining with the base.

According to an optimum embodiment of the present disclosure, the transmission and clutch device further comprises a second gear and a third gear, the second gear and the third gear are fixed on the base in a rotatable manner, the first gear, the second gear and the third gear are meshed successively to form a two-stage outer meshing spur gear transmission mechanism, and the third gear is provided for directly driving the lead screw to rotate.

According to an optimum embodiment of the present disclosure, the transmission and clutch device further comprises a screw for fixedly connecting the first drive shaft with the second drive shaft.

The technical solution of the present invention further provides an electric chassis, which is provided for carrying a breaker to implement advancement and withdrawal of the breaker, comprising a chassis housing, characterized by further comprising the transmission and clutch device.

According to an optimum embodiment of the present disclosure, the chassis housing and a breaker housing are separated.

According to an optimum embodiment of the present disclosure, the chassis housing also acts as a breaker housing.

According to an optimum embodiment of the present disclosure, the chassis housing comprises a first compartment for accommodating a breaker mechanism, and a second compartment for accommodating the transmission and clutch device, the motor and the lead screw.

The transmission and clutch device of the electric chassis according to the present invention has advantages of a simple structure, a small occupancy space, a compact structure, convenient operations, reliable acts, and the like. Since the present invention realizes clutch conversion on the same shaft, the axis of the motor and the axis of the gear are arranged in parallel, resulting in great flexibility of its structure and the transmission direction. Therefore, the transmission and clutch device according to the present invention has a more compact structure and is flexibly adapted for different breakers, thereby significantly improving integration, modularization and standardization of the transmission and clutch device.

The present invention will be further described below with reference to the drawings and example embodiments.

BRIEF DESCRIPTION OF THE DRAWINGS

In order to describe embodiments of the present invention more clearly, the following drawings are provided. It would be appreciated that the drawings only illustrate preferred embodiments of the present invention exemplarily, but should not be construed as limiting the present invention, in which:

FIGS. 3A-3C are sectional views of the transmission and clutch device at different states according to an optimal embodiment of the present invention, in which FIG. 3A is a diagram of a clutch state, and FIGS. 3B and 3C are diagrams of two different engaged states, respectively;

Throughout the specification and drawings, the same reference symbols refer to the same or similar features and elements.

DETAILED DESCRIPTION OF EMBODIMENTS

Figure 1:
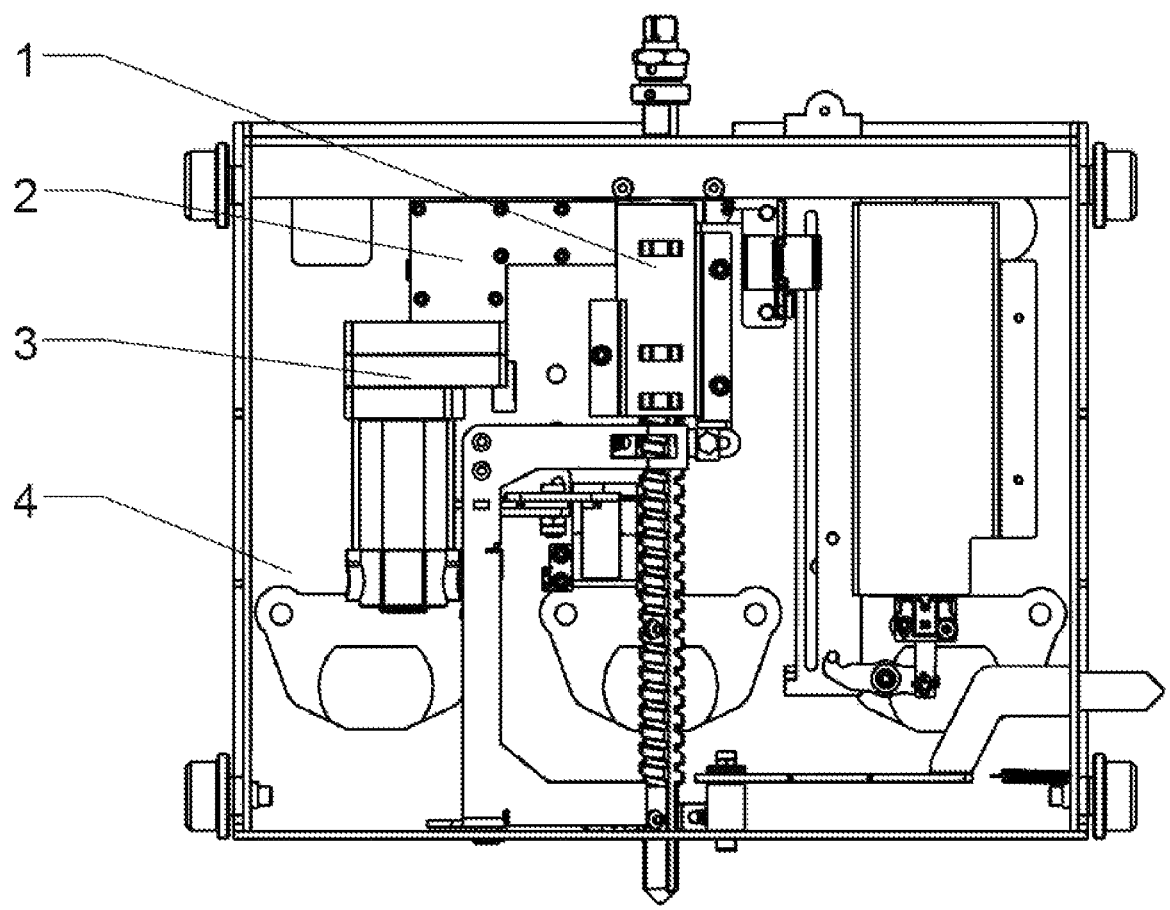
FIG. 1 is a structure diagram of an electric chassis according to an optimal embodiment of the present invention.

An example solution of the present invention will be described below in detail with reference to the following description and drawings. The drawings of the present disclosure are not all drawn according to an actual size of a specific implementation, and size variations cannot be construed as limitation to the present invention. The expression "as shown in . . . " or a similar expression indicates that a particular technical feature is described with reference to a certain drawing, but it should not be interpreted that the particular technical feature or its counterpart is only comprised in the drawing.

Hereinafter, some direction terms, for example, "left", "right", "up", "down", "front", "rear", "clockwise", "counterclockwise" and others, are only used to denote directions as indicated with reference to the drawings, but the directions denoted by these direction terms are varied with the application occasions. Moreover, terms "first", "second", "third" and the like are used to describe a plurality of components without implying a sequence thereof, which are only provided to differentiate one from another.

FIG. 1 illustrates a specific electric chassis for a breaker according to the present invention, which can be switched between an electric mode and a manual mode to cause the position of the breaker changed as needed, thereby implementing advancement and withdrawal of the breaker. The electric chassis comprises a lead screw 1, a transmission and clutch device 2, a motor 3, a chassis bracket 4 and a housing. Wherein, the lead screw 1, the transmission and clutch device 2 and the motor 3 are mounted on the chassis bracket 4. In the electric mode, a movement of the motor 3 is transmitted via the transmission and clutch device 2 to the lead screw 1, causing axial movement of the breaker, for example movement between a testing position and a work position. In the manual mode, the lead screw 1 can be rotated by manual drive to implement the axial movement of the breaker.

The transmission and clutch device 2 of the chassis will be introduced below in detail. It would be appreciated that the introduction comprised herein is only provided as an example, and having learnt the present invention, those skilled in the art would make various changes or modification to the contents described herein. For brevity, all the possible changes, modification or equivalent would not be enumerated in this context, but these changes, modification or equivalents are certainly covered in the disclosure and protection scope of the present disclosure.

Figure 2:
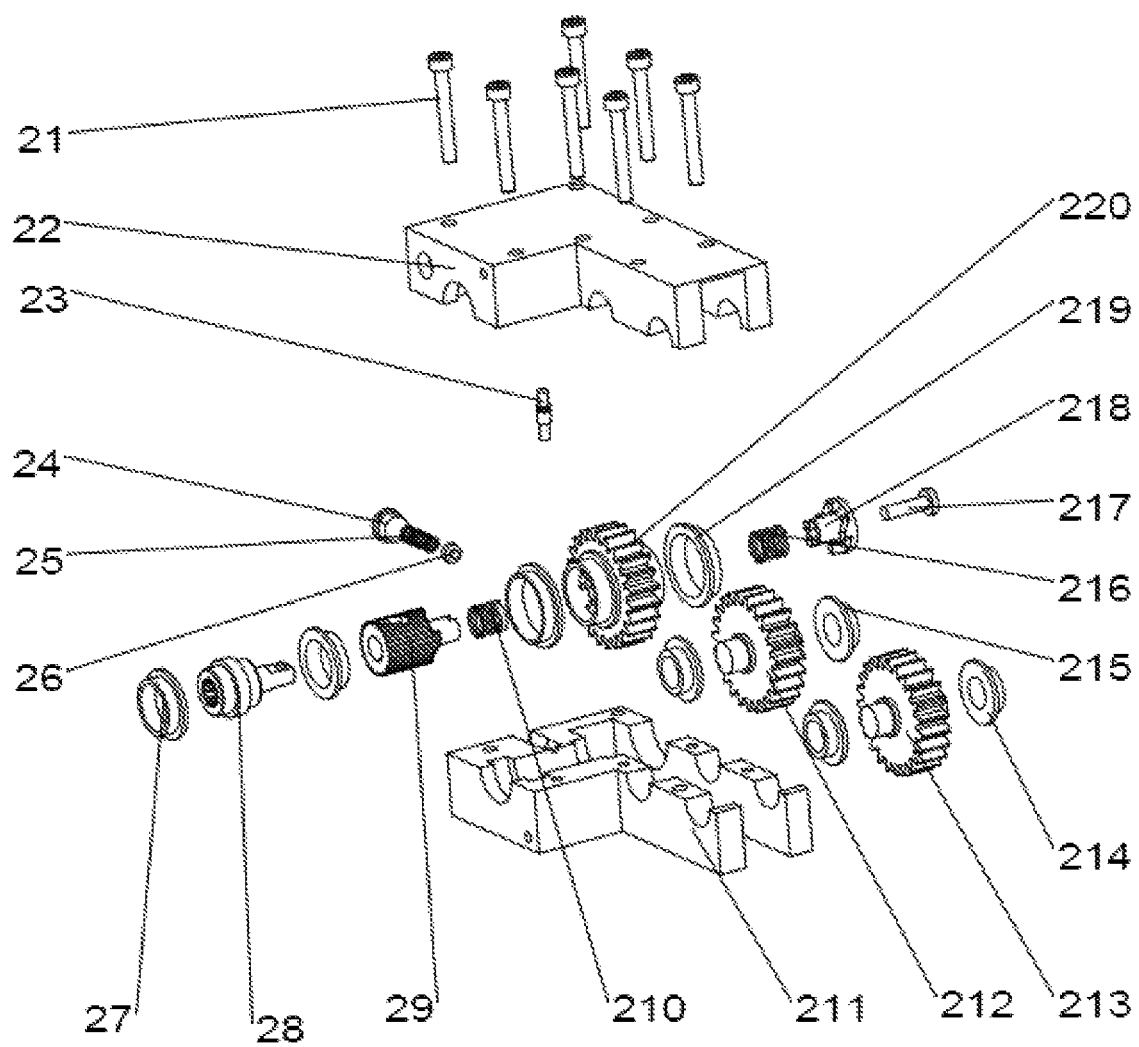
FIG. 2 is an exploded perspective diagram of a transmission and clutch device according to an optimal embodiment of the present invention.

FIG. 2 is an exploded perspective diagram of a transmission and clutch device according to an optimal embodiment of the present invention. The transmission and clutch device 2 comprises a transmission shaft 28, a first drive shaft 29, a first compression spring 210, a first gear 220, a second compression spring 216 and a second drive shaft 218 successively along an axial direction. The first drive shaft 29 and the second drive shaft 218 can be fixed together in any known manner in the art, and for example, the first and second drive shafts 29, 218 are fixed together using a screw 217. The drive shaft 28 is connected to the motor 3, and the first gear 220 is fixed on a base 211 or the upper closure cover 22 in a rotatable manner. The first drive shaft 29 is connected with the transmission shaft 28 in a relatively sliding manner, and can synchronously rotate with the transmission shaft 28.

Figure 6:
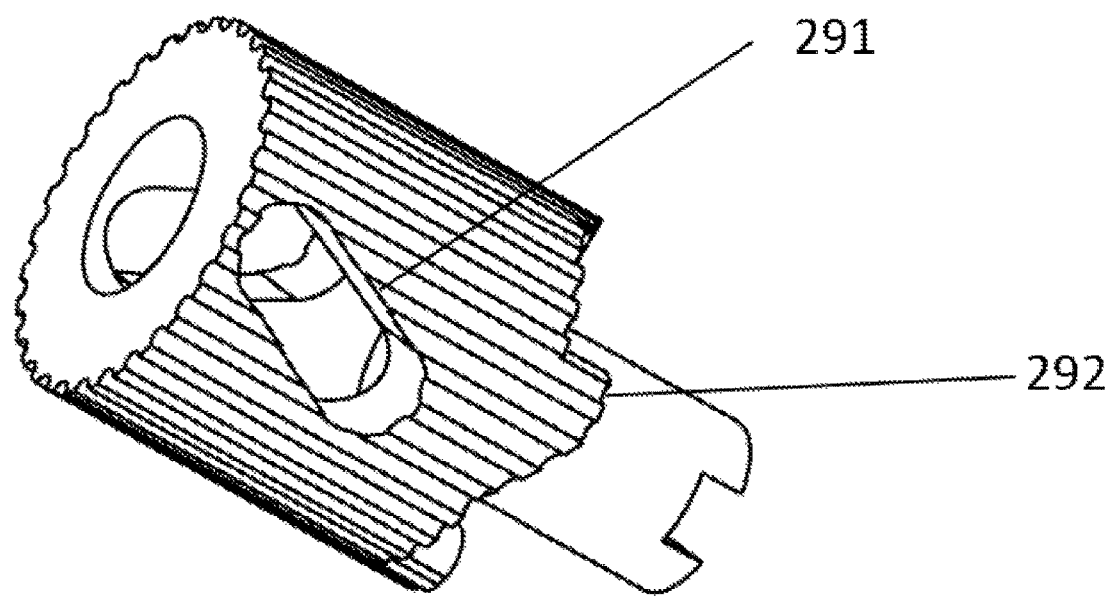
FIG. 6 is a perspective diagram of a first drive shaft of a transmission and clutch device according to an optimal embodiment of the present invention.
Figure 7:
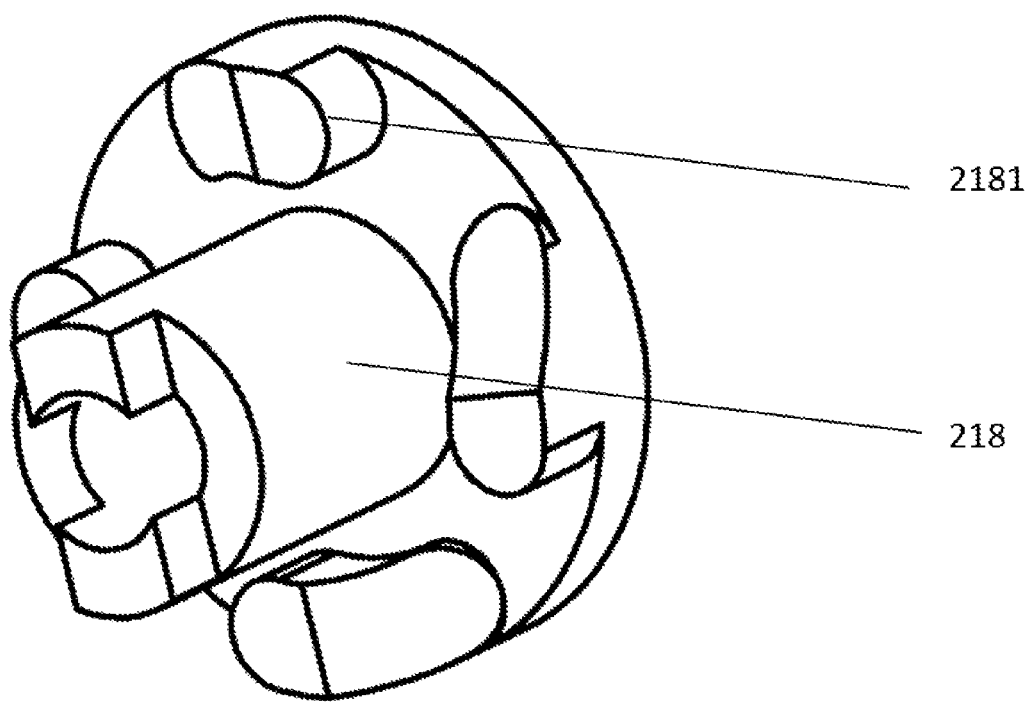
FIG. 7 is a perspective diagram of a second drive shaft of a transmission and clutch device according to an optimal embodiment of the present invention.
Figure 8:
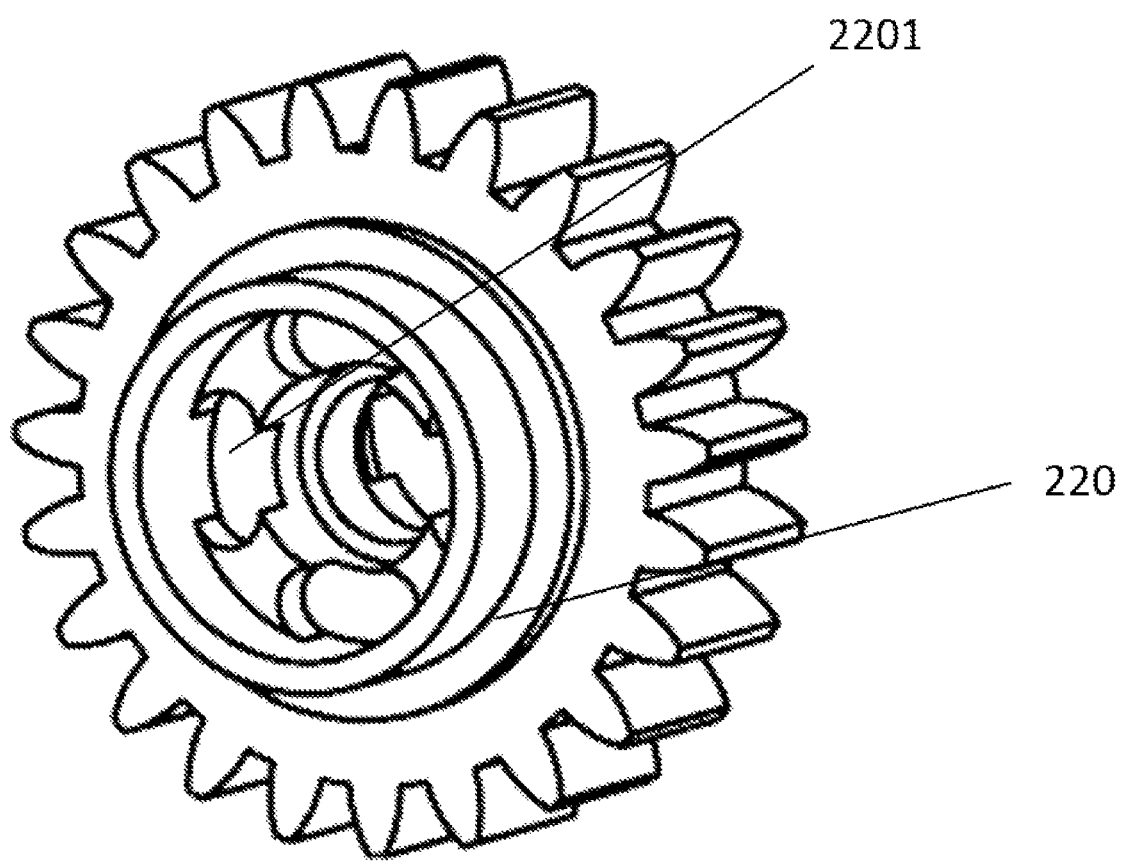
FIG. 8 is a perspective diagram of a first gear of a transmission and clutch device according to an optimal embodiment of the present invention.

As shown in FIG. 8, a keyway 2201 is formed in each of two end faces of the first gear 220 and can separably cooperate with a protrusion 292 of the end face of the first drive shaft 29 as shown in FIG. 6 or a protrusion 2181 of the second drive shaft 218 as shown in FIG. 7. The protrusions 292 and 2181 may have various shapes and structures and may be one or more, which are preferably a plurality of protrusions distributed axisymmetrically. When the keyway 2201 cooperates with the protrusion at either end, the lead screw 1 is electrically driven to rotate, while the lead screw 1 is manually driven to rotate during separation.

Figure 9:
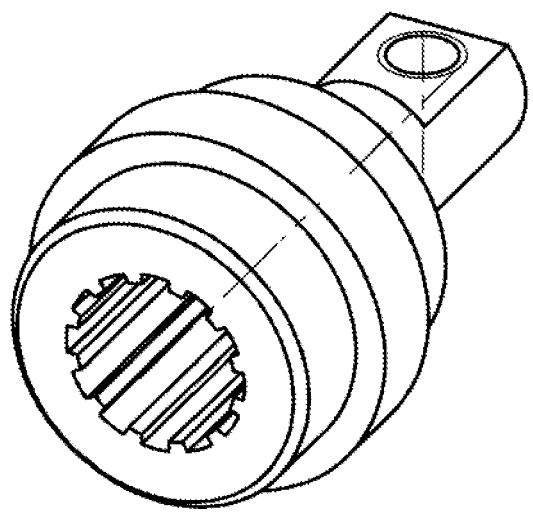
FIG. 9 is a perspective diagram of a drive shaft of a transmission and clutch device according to an optimal embodiment of the present invention.

The motor 3 may be any appropriate motor, preferably a Direct Current (DC) reversible motor, which can be rotated forwardly or reversely. The motor 3 may be an assembly component, i.e., a combination of a motor and a gearbox in fact, such that the rotating speed of the output shaft of the motor 3 can satisfy the requirement. The motor 3 may also only comprise a motor and the gearbox is integrated with the gear transmission, so as to remarkably reduce the size of the motor and lower the motor cost. The output shaft 13 of the motor 3 can be any suitable shaft, and for example, the output shaft of the motor 3 is a spline shaft to cooperate with an internal spline hole of the transmission shaft 28 as shown in FIG. 9.

In the embodiment as shown in FIG. 2, the first drive shaft 29 is partly arranged outside the transmission shaft 28, the first drive shaft 29 is provided with an oblique opening 291, and a drive pin 23 is mounted on the transmission shaft 28 by passing through the oblique opening 291 of the first drive shaft 29 from inside of a circumference, causing the first drive shaft to be rotatable with the transmission shaft in a relatively sliding manner. The cooperation therebetween may be implemented through other drive mechanism, and for example, the drive shaft 28 provided with a second oblique opening is partly arranged outside the first drive shaft 29, and the second drive pin is mounted on the first drive shaft 29 by passing through the second oblique opening of the transmission shaft 28 from inside of a circumference, which can also achieve that the first drive shaft is synchronously rotated with the transmission shaft in a relatively sliding manner.

Figure 4:
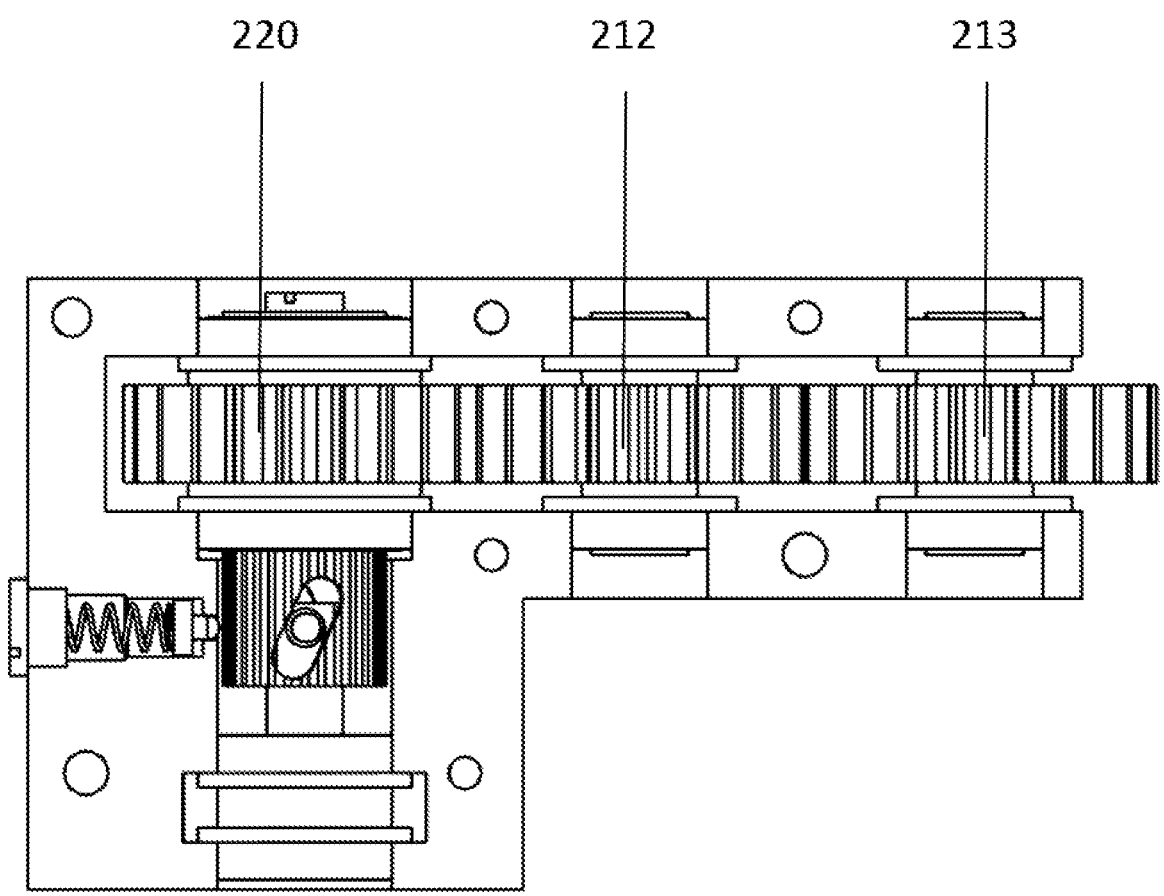
FIG. 4 is a top view of a transmission and clutch device according to an optimal embodiment of the present invention.

In order to implement the axial movement better while the first drive shaft is rotating, as shown in FIGS. 2 and 4, there is a friction structure to achieve a force balance. Any appropriate friction structure in the art can be selected, for example an adjustment screw 24, an adjustment spring 25 and a friction block 26 mounted coaxially, to achieve the force balance. The adjustment screw 24 is fixed on the base 211 or the upper closure cover 22, the adjustment spring 25 is clamped between the adjustment screw 24 and the friction block 26, and the friction block 26 abuts against an outer circle of the first drive shaft 29 to provide a friction resistance for rotation of the first drive shaft 29. The periphery of the first drive shaft 29 is rough, and preferably is the spline shaft as shown in FIG. 6, to increase the friction resistance and thus achieve the force balance and thus avoid idling of the first drive shaft 29.

Figure 5:
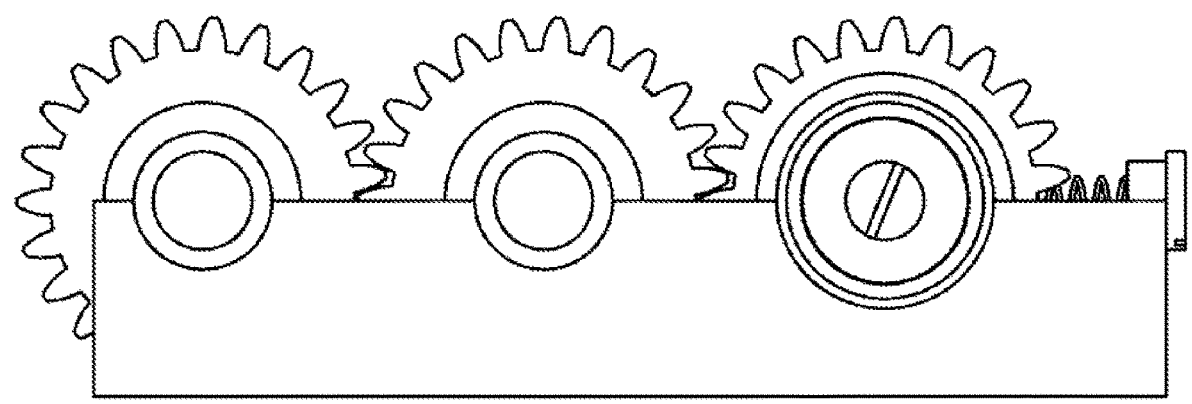
FIG. 5 is a side view of a transmission and clutch device according to an optimal embodiment of the present invention.

It is implemented by a transmission mechanism that the lead screw 1 is driven to rotate by the first gear 220. As shown in FIGS. 4-5, the transmission mechanism is a two-stage outer meshing spur gear mechanism, comprising a second gear 212 and a third gear 213, the second gear 212 and the third gear 218 are fixed onto the base 211 or the upper closure cover 22 in a rotatable manner, the first gear 220, the second gear 212 and the third gear 213 are meshed successively, and the lead screw 1 is directly driven by the third gear 213. Such two-stage outer meshing spur gear mechanism implements delicately transmission of the rotational movement on two parallel axes. Of course, the transmission can be other transmission mechanism in the art, such as chain transmission, bevel gear transmission, belt transmission, or the like.

Figure 10:
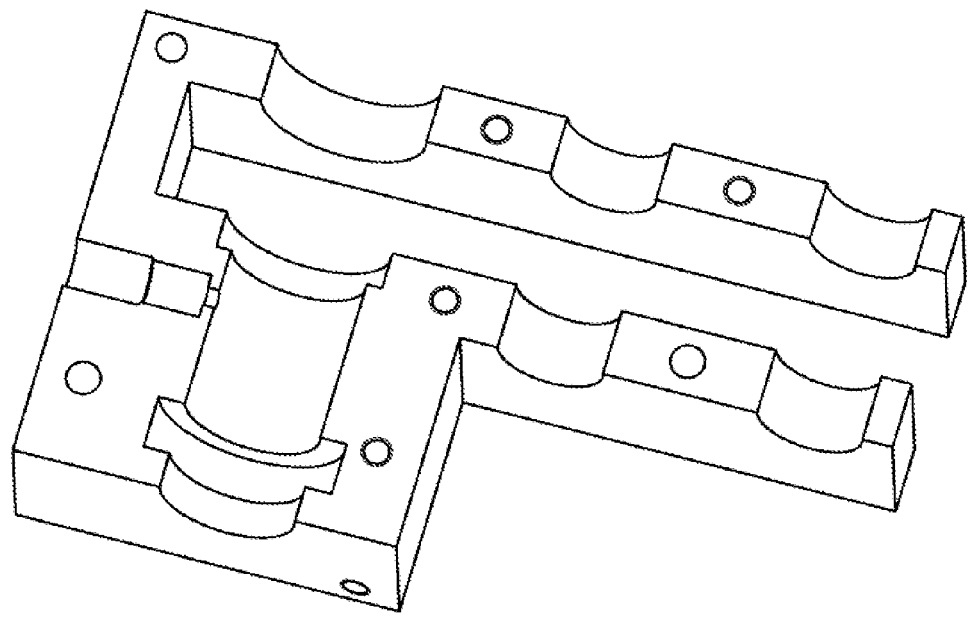
FIG. 10 is a perspective diagram of a base of a transmission and clutch device according to an optimal embodiment of the present invention.
Figure 11:
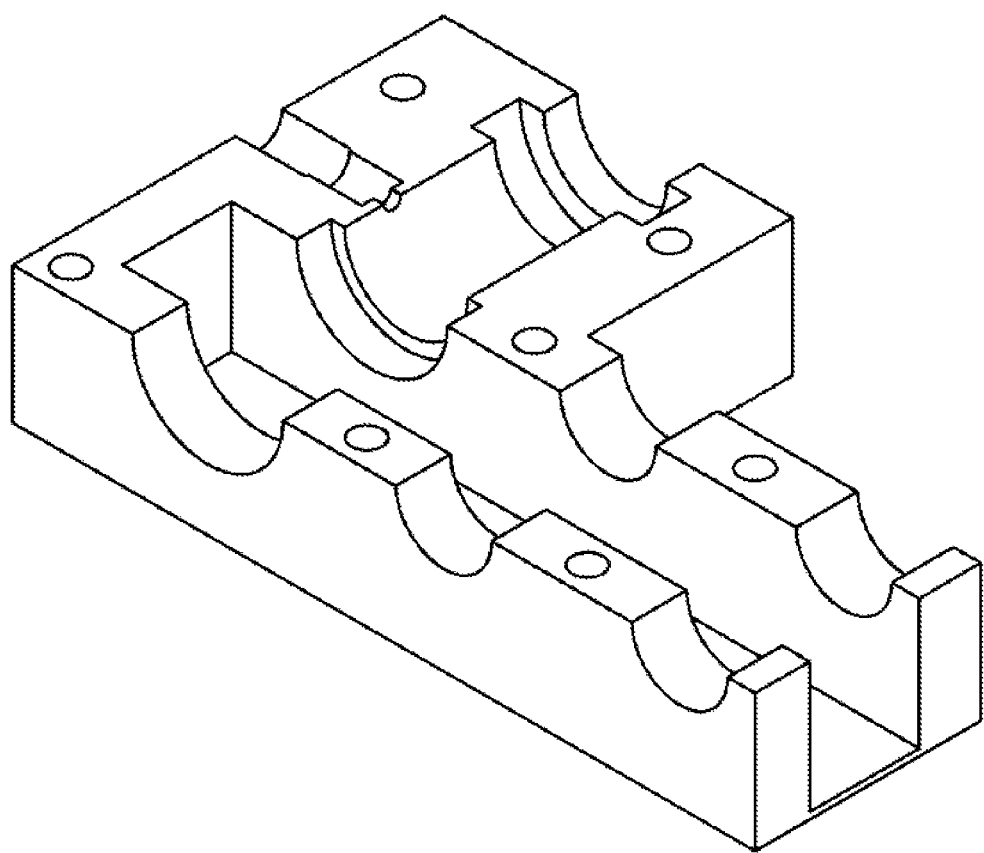
FIG. 11 is a perspective diagram of an upper closure cover of a transmission and clutch device according to an optimal embodiment of the present invention.

As shown in FIGS. 10-11, the transmission and clutch device can further comprise the base 211 and the upper closure cover 22 joined with each other, to protect other parts, fix the adjustment screw 24 and fix each gear in a rotatable manner.

The electric chassis according to the present invention can further comprise a control system for controlling start, stop and forward and reversal rotation of the motor 3, and acts of each component or mechanism of the electric chassis, so as to accomplish the purpose of unattended or remote control of a power station, thereby satisfying needs of a smart grid and the like. For example, the control system comprises a movement terminal position switch which is typically a normally closed switch that transmits a signal to the control system when the chassis arrives at a terminal to stop the operation of the motor 3.

Figure 12:
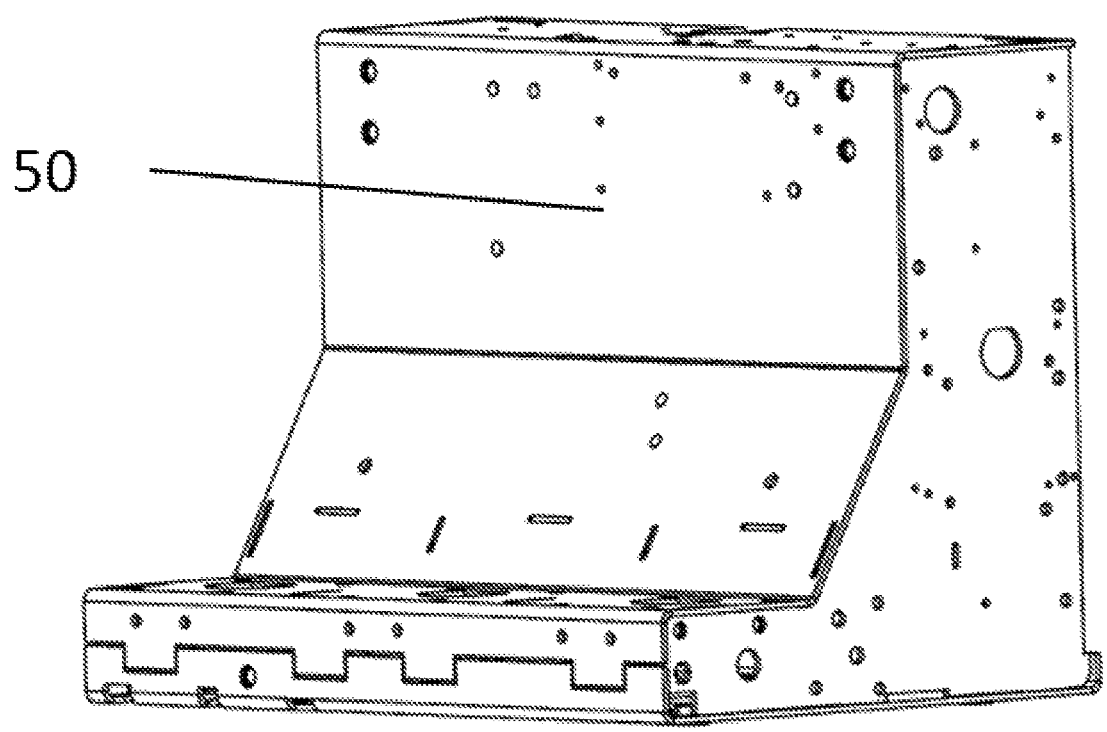
FIG. 12 is a diagram of a breaker housing according to an optimal embodiment of the present invention.
Figure 13:
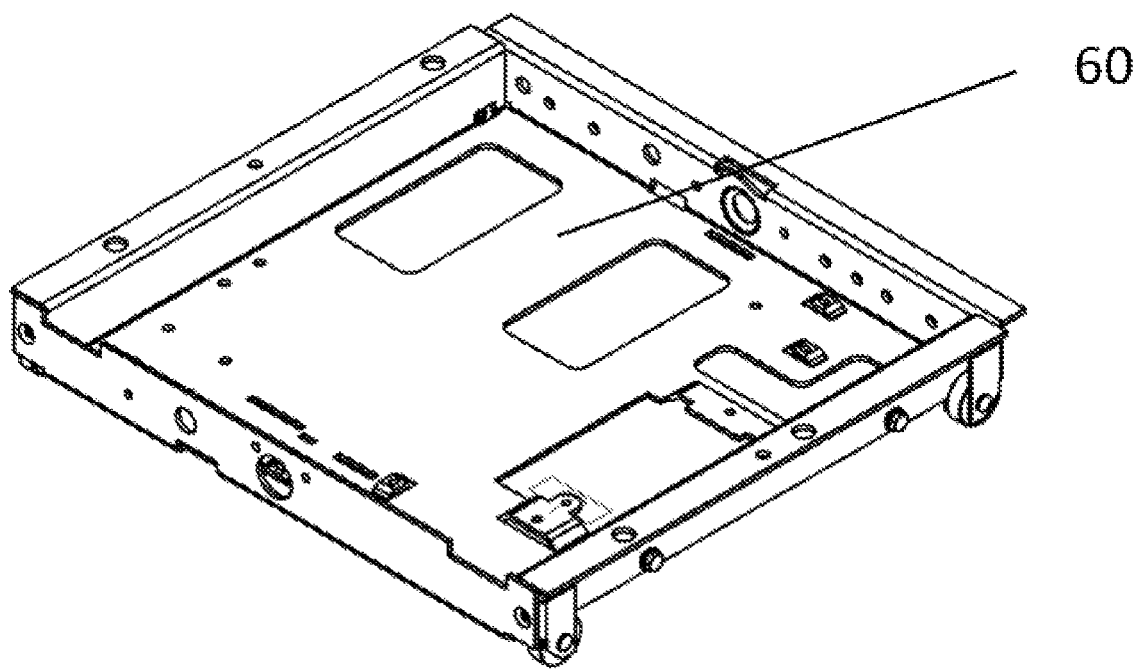
FIG. 13 is a diagram of an electric chassis housing according to an optimal embodiment of the present invention.

As shown in FIGS. 12-13, the breaker housing 50 and the chassis housing 60 according to the present invention may have a conventional separation structure and may be connected with each other via a bolt, but such solution incurs complicated mounting and a high cost.

Figure 14:
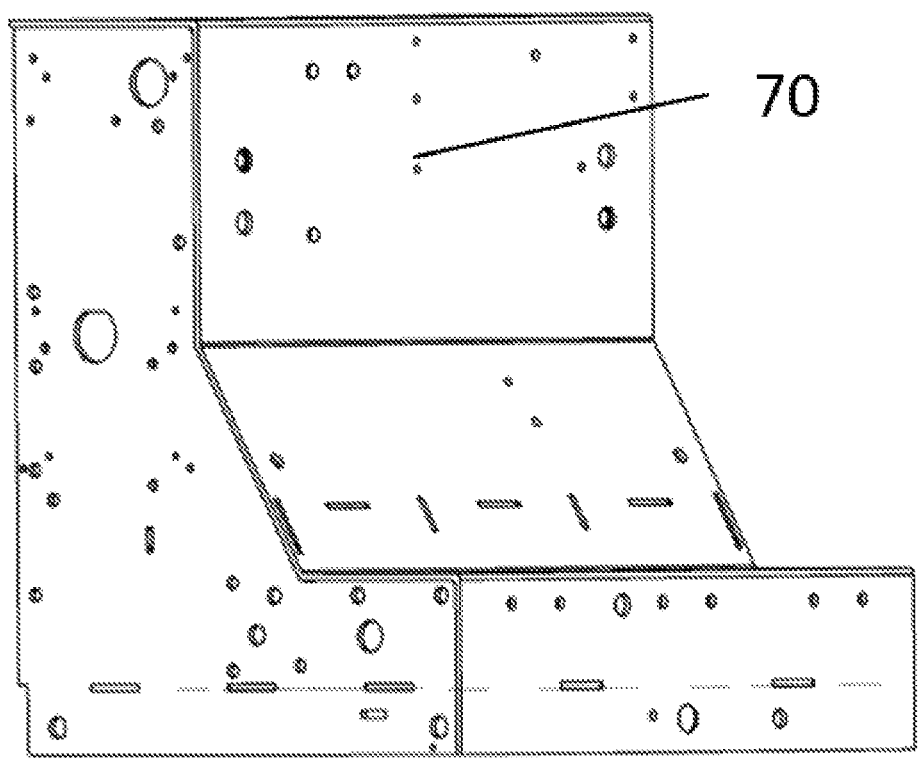
FIG. 14 is a perspective diagram of an integral housing according to a further optimal embodiment of the present invention.
Figure 15:
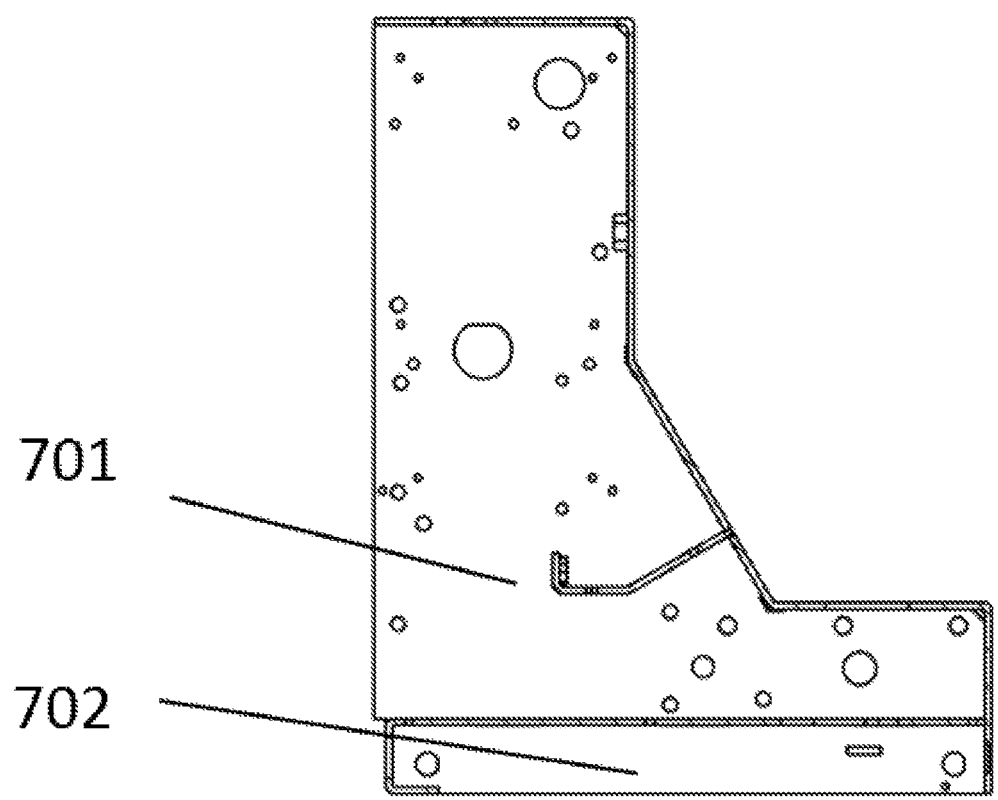
FIG. 15 is a side view of an integral housing according to a further optimal embodiment of the present invention.

Further, as shown in FIGS. 14-15, the present invention may also employ an integral housing 70 which integrates the conventional breaker housing 50 and the conventional chassis housing 60. The housing comprises two compartments: a compartment 701 as an assembly compartment of elements, such as a breaker mechanism and the like; and a compartment 702 as an assembly compartment of elements, such as a motor, a lead screw, a transmission and clutch device, a beam, and the like. The solution can save material and reduce assembly time.

The electric chassis according to the present invention is applicable to a breaker at a different voltage level, such as a breaker of 12 kV, a breaker of 40.5 kV, and the like. As the voltage is higher, there is a stricter insulation requirement, and thus the breaker has a larger size and a heavier weight, such that higher carrying power is required by the chassis. The chassis according to the present invention successfully accomplishes clutch conversion on the same shaft, and has a small size and a simple structure to reduce the space required remarkably, enabling great flexibility of the structure and the transmission direction. Hence, the present application implements motorization and automatic control of the breaker, resolves a conflict between a carrying capacity of the chassis and space restrictions, and can be flexibly adapted for a breaker at a different voltage level and significantly improve integration, modularization and standardization of the design.

For better understanding on the present invention, the operation process of the breaker chassis according to the present invention will be described briefly below with reference to FIGS. 3A-3C.

Figure 3A:
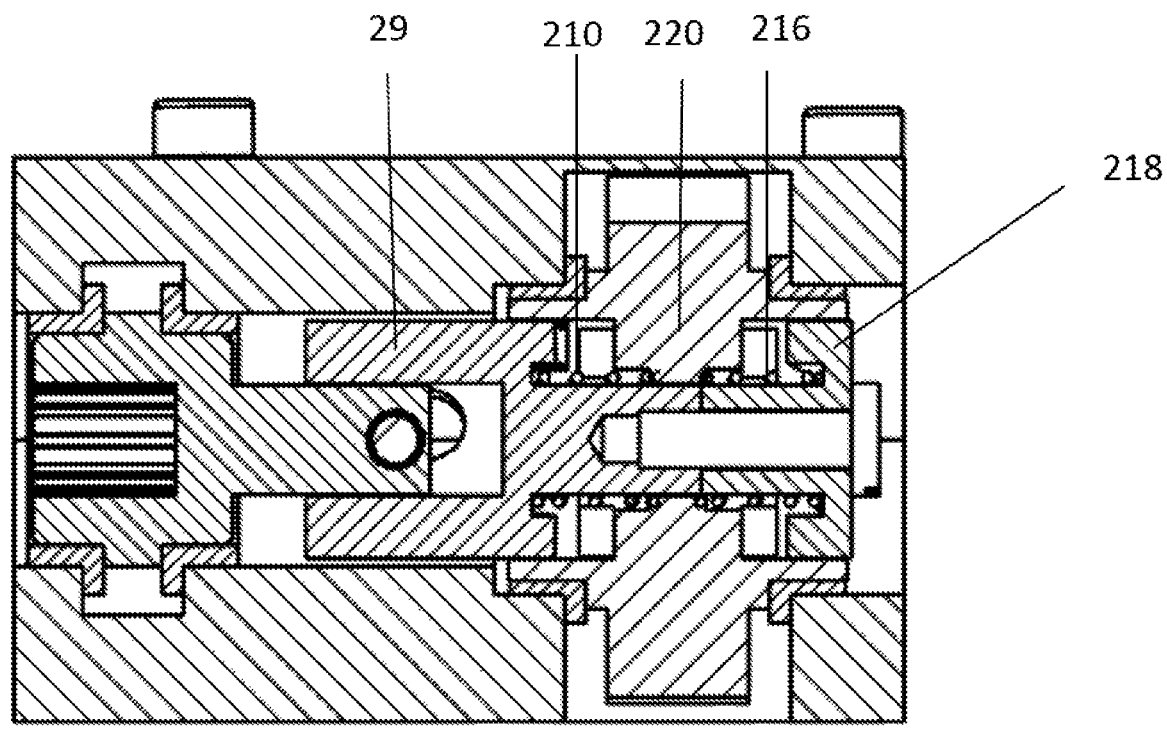

As shown in FIG. 3A, at a clutch state, the motor 3 is stopped, the first compression spring 210 and the second compression spring 216 move the first drive shaft 29 and the second drive shaft 218 to a spring pressure equalization position, i.e., the first gear 220 is between the first drive shaft 29 and the second drive shaft 218, the protrusion 292 of the first drive shaft 29 and the feature 2181 of the second drive shaft 218 are both separated from the keyway 2201 of the first gear 220, and at this time, the clutch is disengaged and the transmission chain is disconnected.

Figure 3B:
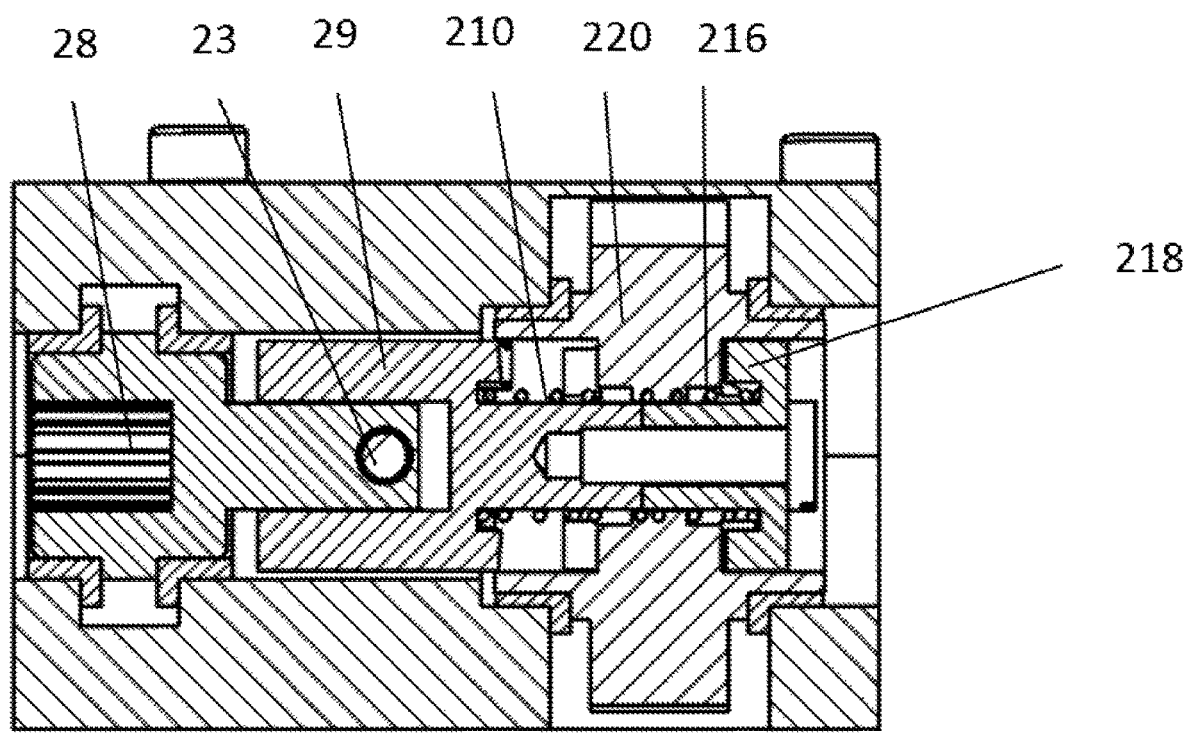

As shown in FIG. 3B, when rotating clockwise (as seen from left to right), the motor 3 is activated to drive the transmission shaft 28 and further drive the drive pin 23 to rotate, the first drive shaft 29 and the second drive shaft 218 are caused to rotate through the drive pin 23 and the oblique opening 291, and meanwhile, upon the effect of the axial force of the drive pin 23, the first drive shaft 29 drives the second drive shaft 218 to overcome a spring force of the second compression spring 216 to move left along the axial direction. When the second drive shaft 218 contacts with the first gear 220, upon the effect of the axial force, the protrusion 2181 (as shown in FIG. 7) on the second drive shaft 218 is pressed into the keyway 2201 (as shown in FIG. 8) on the gear 220, thereby driving the first gear 220 to rotate and further driving the second gear 212 and the subsequent transmission mechanism to move.

Figure 3C:
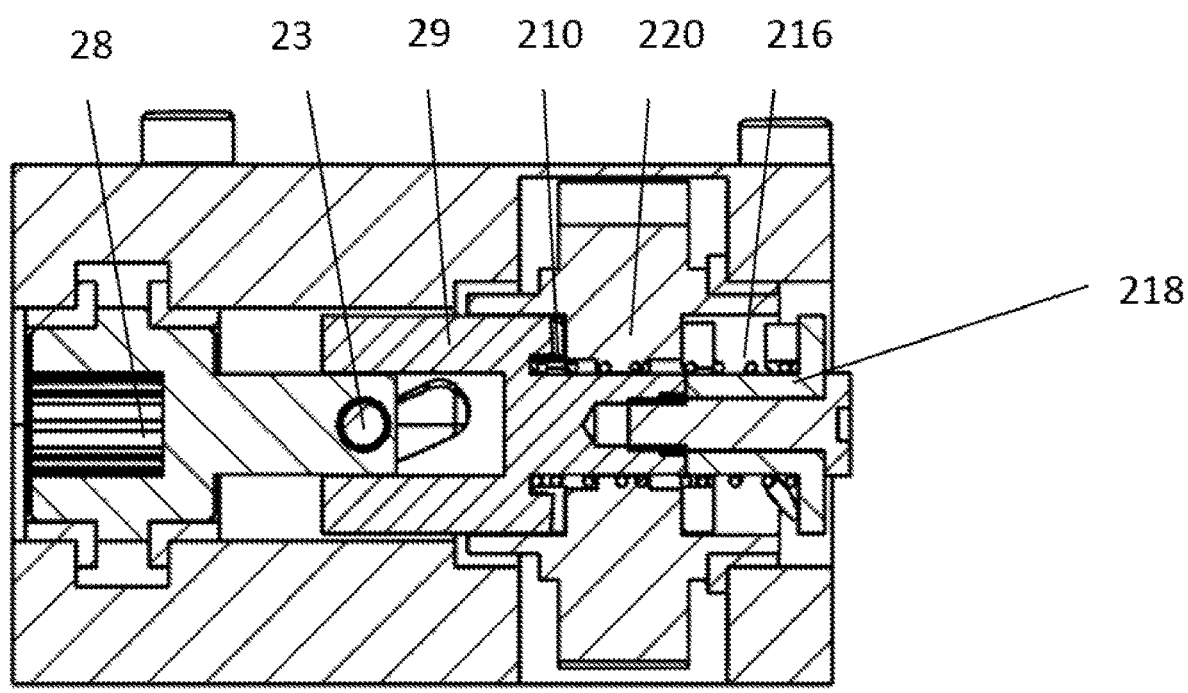

As shown in FIG. 3C, when rotating counterclockwise (as seen from left to right), the motor 3 is activated to drive the transmission shaft 28 and further drive the drive pin 23 to rotate, the first drive shaft 29 and the second drive shaft 218 are caused to rotate through the drive pin 23 and the oblique opening 291, and meanwhile, upon the effect of the axial force of the drive pin 23, the first drive shaft 29 overcomes the spring force of the first compression spring 210 to move right along the axial direction. When the first drive shaft 29 contacts the first gear 220, upon the effect of the axial force, the protrusion 292 (as shown in FIG. 6) on the first drive shaft 29 is pressed into the keyway 2201 (as shown in FIG. 8) on the gear 220, thereby driving the first gear 220 to rotate and further driving the second gear 212 and the subsequent transmission mechanism to move.

The foregoing technical solutions can be combined as needed to produce an optimum technical effect.

The above description only provides principles and preferred embodiments of the present invention. It should be pointed out that, although the preferred embodiments of the present invention and the drawings are disclosed for clarifying the objective of the present invention, those skilled in the art may make various substitution, changes and modification without departing spirits and scope of the claims appended hereinafter. On the basis of the principles of the present invention, several other variants should also be regarded as falling into the protection scope of the present invention. Therefore, the present invention shall not be confined to the disclosure of the preferred embodiments and the drawings, and the protection scope of the present invention is based on the scope defined in the appended claims.

We claim:

1. A transmission and clutch device of an electric chassis, for implementing advancement and withdrawal of a breaker electrically and manually, the transmission and clutch device comprises:

a transmission shaft, a first drive shaft, a first compression spring, a first gear, a second compression spring and a second drive shaft successively along an axial direction, the first drive shaft and the second drive shaft are fixed together, the transmission shaft is provided for connecting to a motor, and the first gear is fixed onto a base in a rotatable manner, wherein the first drive shaft is connected with the transmission shaft in a relatively sliding manner and rotatable synchronously with the drive shaft; and two end faces of the first gear are both formed with a keyway for separably cooperating with a protrusion of an end face of the first drive shaft or a protrusion of an end face of the second drive shaft, wherein a lead screw is electrical driven to rotate during cooperating, and the lead screw is driven manually to rotate during separation.

2. The transmission and clutch device of claim 1, further comprising a drive pin, wherein the first drive shaft is partly arranged outside the transmission shaft, the first drive shaft is provided with an oblique opening, and the drive pin is mounted on the transmission shaft by passing through the oblique opening of the first drive shaft from inside of a circumference.

3. The transmission and clutch device of claim 2, further comprising: an adjustment screw, and adjustment spring and a friction block, wherein the adjustment screw is fixed on the base, the adjustment spring is clamped between the adjustment screw and the friction block, and the friction block abuts against a periphery of the first drive shaft for providing a friction resistance for rotation of the first drive shaft.

4. The transmission and clutch device of claim 3, wherein the periphery of the first drive shaft is rough for increasing the friction resistance.

5. The transmission and clutch device of claim 4, wherein the first drive shaft is a spline shaft for increasing the friction resistance.

6. The transmission and clutch device of claim 1, wherein the transmission shaft is provided with an internal spindle hole for cooperating with a spline output shaft of the motor.

7. The transmission and clutch device of claim 1, further comprising a second drive pin, wherein the transmission shaft is partly arranged outside the first drive shaft, the transmission shaft is provided with a second oblique opening, and the second drive pin is mounted on the first drive shaft by passing through the second oblique opening of the transmission shaft from inside of a circumference.

8. The transmission and clutch device of claim 1, further comprising an upper closure cover for joining with the base.

9. The transmission and clutch device of claim 1, further comprising a second gear and a third gear, wherein the second gear and the third gear are fixed on the base in a rotatable manner, the first gear, the second gear and the third gear are meshed successively to form a two-stage outer meshing spur gear transmission mechanism, and the third gear is provided for directly driving the lead screw to rotate.

10. The transmission and clutch device of claim 1, further comprising a screw for fixedly connecting the first drive shaft with the second drive shaft.

11. An electric chassis for carrying a breaker to implement advancement and withdrawal of the breaker, comprising:
   a chassis housing, further comprising the transmission and clutch device of claim 1.

12. The electric chassis according to claim 11, wherein the chassis housing and a breaker housing are separated.

13. The electric chassis according to claim 11, wherein the chassis housing also acts as a breaker housing.

14. The electric chassis according to claim 13, wherein the chassis housing comprises a first compartment for accommodating a breaker mechanism, and a second compartment for accommodating the transmission and clutch device, the motor and the lead screw.

* * * * *